United States Patent
Peng et al.

(10) Patent No.: US 11,928,446 B2
(45) Date of Patent: Mar. 12, 2024

(54) MULTI-LEVEL INTERMEDIATE REPRESENTATION DECODER FOR HETEROGENEOUS PLATFORMS

(71) Applicant: KWAI INC., Palo Alto, CA (US)

(72) Inventors: Zhen Peng, Palo Alto, CA (US); Yang Liu, San Jose, CA (US); Hanxian Huang, Palo Alto, CA (US); Yongxiong Ren, San Jose, CA (US); Jishen Yang, Palo Alto, CA (US); Lingzhi Liu, San Jose, CA (US); Xin Chen, Palo Alto, CA (US)

(73) Assignee: KWAI INC., Palo Alto, CA (US)

( * ) Notice: Subject to any disclaimer, the term of this patent is extended or adjusted under 35 U.S.C. 154(b) by 171 days.

(21) Appl. No.: 17/524,619

(22) Filed: Nov. 11, 2021

(65) Prior Publication Data

US 2023/0143291 A1   May 11, 2023

(51) Int. Cl.
*G06F 8/41* (2018.01)
*G06N 3/04* (2023.01)
*G06N 3/063* (2023.01)
*G06N 3/08* (2023.01)
*G06N 3/10* (2006.01)

(52) U.S. Cl.
CPC ............... *G06F 8/443* (2013.01); *G06N 3/04* (2013.01); *G06N 3/063* (2013.01); *G06N 3/08* (2013.01); *G06N 3/105* (2013.01)

(58) Field of Classification Search
CPC ........... G06F 8/443; G06F 8/447; G06N 3/04; G06N 3/08; G06N 3/044; G06N 3/045; G06N 3/105
USPC ......................................................... 717/146
See application file for complete search history.

(56) References Cited

U.S. PATENT DOCUMENTS

| | | | |
|---|---|---|---|
| 2019/0318225 A1* | 10/2019 | Heinecke et al. | G06N 3/045 |
| 2021/0004645 A1* | 1/2021 | Chaudhuri et al. | G06N 3/045 |
| 2021/0006465 A1* | 1/2021 | Chaudhuri et al. | G06N 3/045 |
| 2021/0294829 A1* | 9/2021 | Bender et al. | G06N 3/04 |

* cited by examiner

*Primary Examiner* — Wei Y Zhen
*Assistant Examiner* — Mohammed N Huda
(74) *Attorney, Agent, or Firm* — Arch & Lake LLP (57) ABSTRACT

A method, apparatus, and a non-transitory computer-readable storage medium for generating heterogenous platform code. The method may obtain a neural network model. The neural network model may be programed to run on at least one platform. The method may also obtain an initial intermediate representation (IR) code by encoding the neural network model, and obtain a target IR code by adding decorations to the initial IR code based on a target platform. The method may also output an executable code optimized to run on the target platform by decoding the target IR code.

18 Claims, 13 Drawing Sheets

```
import onnx
import tvm.relay as relay
onnx_model = onnx.load(model_path)
mod, params = relay.frontend.from_onnx(onnx_model, shape_dict)
print(mod, file=open("output_relay.txt", "w"))
```

FIG. 6

```
@target:cuda
def @main(%input.1: Tensor[(1, 3, 224, 224), float32], %bn1.bias: Tensor[(64), float32], %bn1.running_mean: Tensor[(64), float32], ...) {
  %0 = nn.conv2d(%input.1, %conv1.weight, strides=[2, 2], padding=[3, 3, 3, 3], kernel_size=[7, 7]);
  %1 = nn.batch_norm(%0, %bn1.weight, %bn1.bias, %bn1.running_mean, %bn1.running_var);
  %2 = %1.0;
  %3 = nn.relu(%2);
  %4 = nn.max_pool2d(%3, pool_size=[2, 2], strides=[2, 2], padding=[0, 0, 0, 0]);
  ...
```

FIG. 7

```
output: 0 op: nn.conv2d inputs: ['input.1'] w: [('conv1.weight', [64, 3,
7, 7])] s: {'strides': [2, 2], 'padding': [3, 3, 3, 3], 'kernel_size':
[7, 7]} c: []
output: 1 op: nn.batch_norm inputs: [0] w: [('bn1.weight', [64]),
('bn1.bias', [64]), ('bn1.running_mean', [64]), ('bn1.running_var',
[64])] s: {} c: []
output: 2 op: PASS inputs: [1] w: [] s: {} c: []
output: 3 op: nn.relu inputs: [2] w: [] s: {} c: []
output: 4 op: nn.max_pool2d inputs: [3] w: [] s: {'pool_size': [2, 2],
'strides': [2, 2], 'padding': [0, 0, 0, 0]} c: []
output: 5 op: nn.conv2d inputs: [4] w: [('layer1.0.conv1.weight', [64,
64, 3, 3])] s: {'padding': [1, 1, 1, 1], 'kernel_size': [3, 3]} c: []
...
```

```
def traverse(Graph):
    cur = Graph.start
    queue.add(cur)
    while queue is not empty:
        cur = queue.pop(queue.first)
        if cur has parents and cur's parents have not all been visited:
            queue.add(cur)
        else:
            # cur's parents have all been visited
            visit(cur)
            cur.is_visited = True
            for cur's every neighbor ngr:
                if ngr.is_visited == False:
                    queue.add(ngr)
```

FIG. 10

```
network, conv_v_0 = add_conv(network, weights, "conv1.weight", "",
input_tensor, num_out=64, k_shape=[7, 7], dilations=[1, 1], pad_pre=[3,
3], pad_post=[3, 3], strides=[2, 2])

PASS_v_1 = conv_v_0
PASS_v_2 = PASS_v_1
relu_v_3    =    network.add_activation(input=PASS_v_2.get_output(0),
type=trt.ActivationType.RELU)

network,         maxpool2d_v_4          =         add_maxpool(network,
input_t=relu_v_3.get_output(0),   k_shape=[2,   2],   strides=[2,   2],
pad_pre=[0, 0], pad_post=[0, 0])

network, conv_v_5 = add_conv(network, weights, "layer1.0.conv1.weight",
"",    maxpool2d_v_4.get_output(0),    num_out=64,    k_shape=[3,   3],
dilations=[1, 1], pad_pre=[1, 1], pad_post=[1, 1])
# ...
```

MULTI-LEVEL INTERMEDIATE REPRESENTATION DECODER FOR HETEROGENEOUS PLATFORMS

TECHNICAL FIELD

This disclosure is related to artificial intelligence and deep learning systems. More specifically, this disclosure relates to methods and apparatus for generating heterogenous platform code for Deep Learning (DL).

BACKGROUND

Deep Neural Networks (DNNs) have become a widely used solution for many machine learning applications. More and more frameworks are emerging and bring new representations for neural networks. Those representations are usually not fully compatible with each other. On the other end, deploying neural networks to diverse platforms requires tremendous effort, making the gap between the design and deployment of neural networks even larger.

Deep Learning (DL) compiler is a promising technology for compiling DL models. It is designed to unite together different neural networks from various DL frameworks, and also make it much easier to deploy those networks to various hardware platforms. Moreover, DL compiler is able to abstract neural networks into the intermediate representation (IR), which provide optimization opportunities to improve inference performance.

SUMMARY

Examples of the present disclosure provide methods and apparatus for bit-depth control for bi-directional optical flow.

According to a first aspect of the present disclosure, a method for generating heterogenous platform code is provided. The method may include obtaining a neural network model. The neural network model may be programed to run on at least one platform. The method may also obtain an initial intermediate representation (IR) code by encoding the neural network model, and obtain a target IR code by adding decorations to the initial IR code based on a target platform. The method may further output an executable code optimized to run on the target platform by decoding the target IR code.

According to a second aspect of the present disclosure, a computing device is provided. The computing device may include one or more processors, a non-transitory computer-readable memory storing instructions executable by the one or more processors. The one or more processors may be configured to obtain a neural network model. The neural network model may be programed to run on at least one platform. The one or more processors may further be configured to obtain an initial IR code by encoding the neural network model, and obtain a target IR code by adding decorations to the initial IR code based on a target platform. The one or more processors may also be configured to output an executable code optimized to run on the target platform by decoding the target IR code.

According to a third aspect of the present disclosure, a non-transitory computer-readable storage medium having stored therein instructions is provided. When the instructions are executed by one or more processors of the apparatus, the instructions may cause the apparatus to obtain a neural network model. The neural network model is programed to run on at least one platform. The instructions may also cause the apparatus to obtain an initial IR code by encoding the neural network model, and obtaining a target IR code by adding decorations to the initial IR code based on a target platform. The instructions may further cause the apparatus to output an executable code optimized to run on the target platform by decoding the target IR code.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

Deep Learning (DL) compiler is a promising technology for compiling DL models. It is designed to unite together different neural networks from various DL frameworks, and also make it much easier to deploy those networks to various hardware platforms. Moreover, DL compiler is able to abstract neural networks into the intermediate representation (IR), which provide optimization opportunities to improve inference performance.

The disadvantages of the existing DL compiler are as follows.

First, it's hard to support the target platforms with special requirements.

Second, it's hard to add customized optimizations into the deployment procedure.

In one or more embodiments, we propose an IR decoder for deploying neural networks to heterogeneous platforms. Its idea is to use IR to represent input neural networks, and then decode the IR into runnable code for desired target platforms. The decoder is able to be highly customized according to specific requirements with regard to the target platform and particular optimization.

Figure 1:
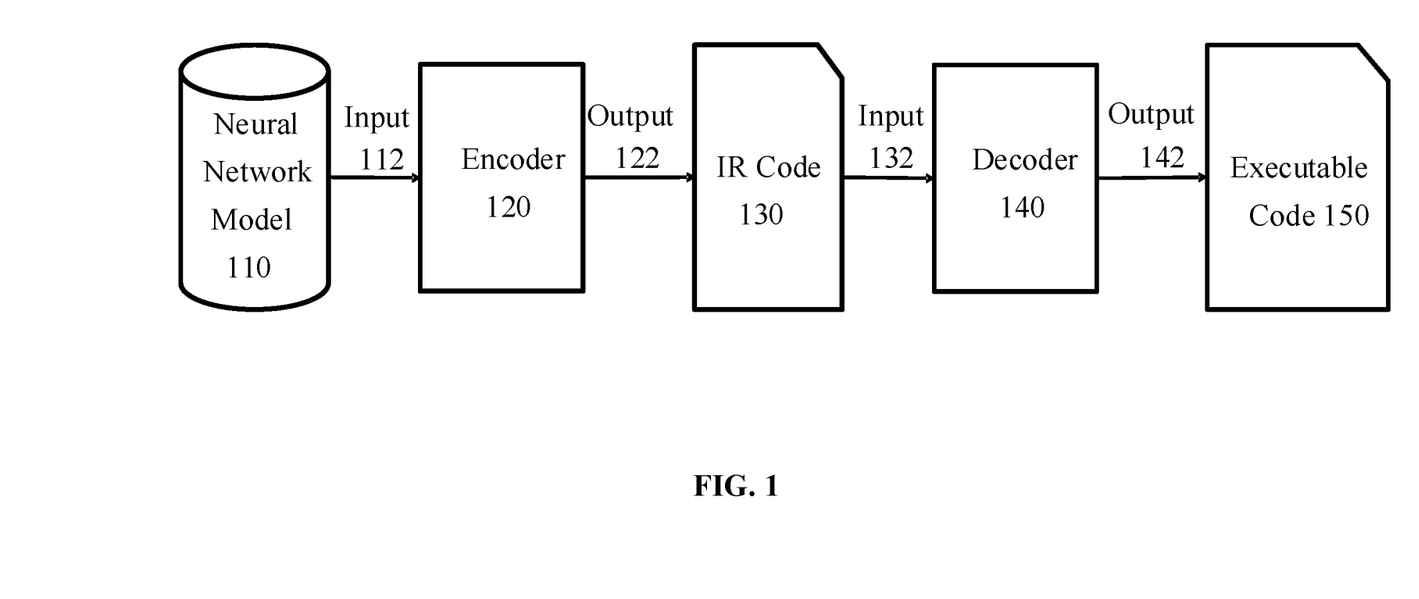
FIG. 1 is a block diagram of a proposed method, according to an example of the present disclosure.

FIG. 1 shows the overall procedure of the transformation. Specifically, FIG. 1 shows a Neural Network Model 110, an Encoder 120, an IR Code 130, a Decoder 140, and Executable Code 150. The Encoder 120 uses Input 112 from the Neural Network Model 110 to generate Output 122. Input 112 is one or more executable code from the Neural Network Model 110. Output 122 may be an encoded IR Code 130 generated by the Encoder 120. The Input 132 of the Decoder 140 is an one or more IR codes from the IR Code 130. Decoder 140 generates Output 142 that can be used as Executable Code 150. Output 142 is one or more executable codes. The transformer starts from a neural network model given by some framework. First, the Encoder take the given model as input and encode it into intermediate representation (IR) code. Second, the Decoder takes the IR code from the Encoder as input and generate executable code for heterogeneous platforms.

Models to Intermediate Representation (IR)

Figure 2:
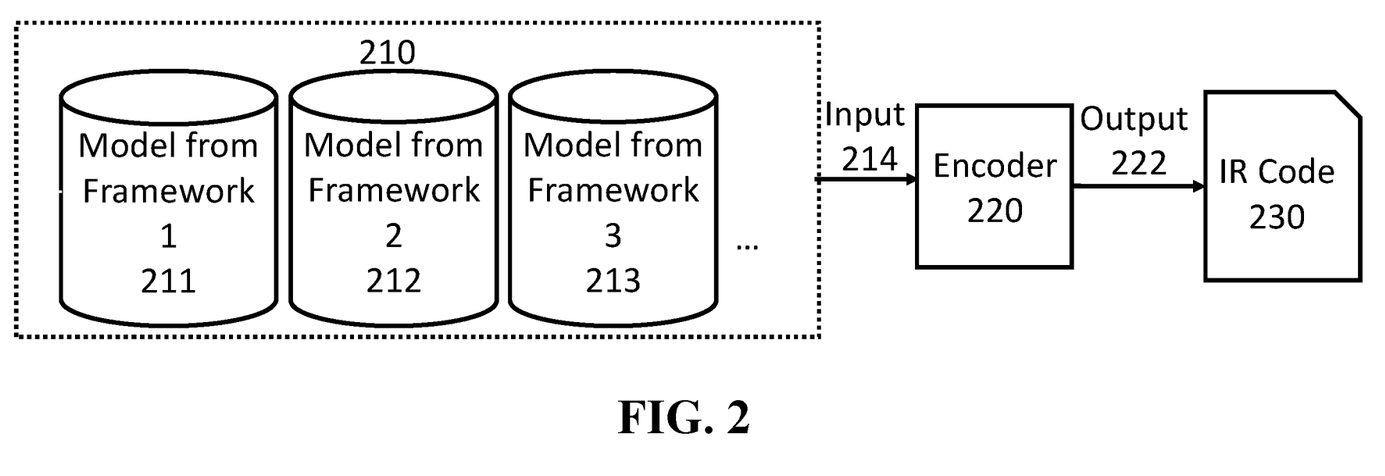
FIG. 2 is a block diagram of the encoder, according to an example of the present disclosure.

FIG. 2 shows an Encoder that converts models from various frameworks to unified IR code. Specifically, FIG. 2 shows models from diverse deep learning frameworks 210, Model from framework 1 211, Model from framework 2 212, Model from framework 3 213, Encoder 220, and IR Code 230. Models from diverse deep learning frameworks 210 includes Model from framework 1 211, Model from framework 2 212, Model from framework 3 213. Encoder 220 uses Input 214 to generate output 222. Input 214 is one or more models from specific frameworks. Output 222 is an IR code that can be used as IR Code 230.

Specifically, FIG. 2 illustrates that the Encoder is able to take various types of models from different deep learning frameworks.

The input of the encoder is a given neural network model, such as a ResNet18 model in .onnx format. For visualization, Netron is a very good tool to see the architecture of a model.

Figure 3:
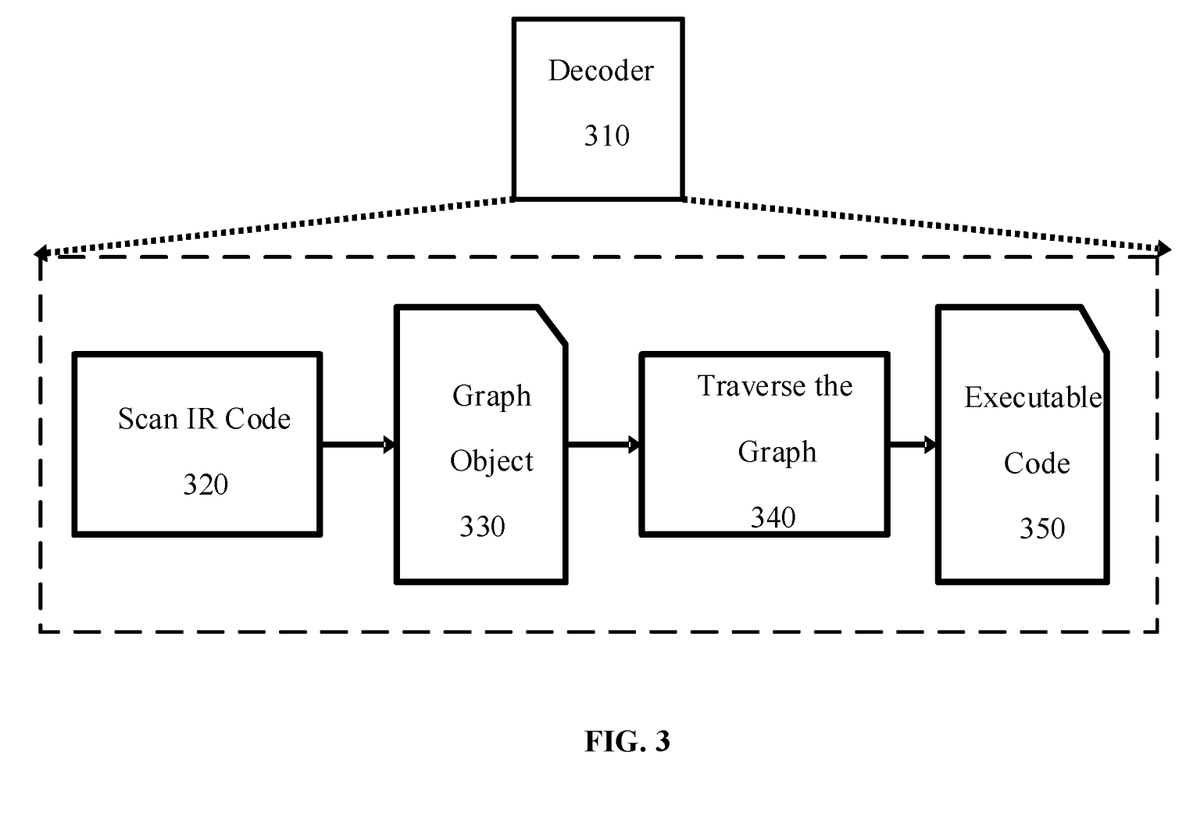
FIG. 3 is a block diagram of the encoder, according to an example of the present disclosure.

FIG. 3 shows a procedure in Decoder of decoding the IR code into executable code. Specifically, FIG. 3 shows Decoder 310. Decoder 310 includes Scan IR Code 320, Graph Object 330, Traverse the Graph 340, and Executable Code 350. The Scan IR Code 320 generates Graph Object 330. Graph Object 330 is traversed in the Traverse the Graph 340 and an Executable Code 350 is generated.

Figure 4:
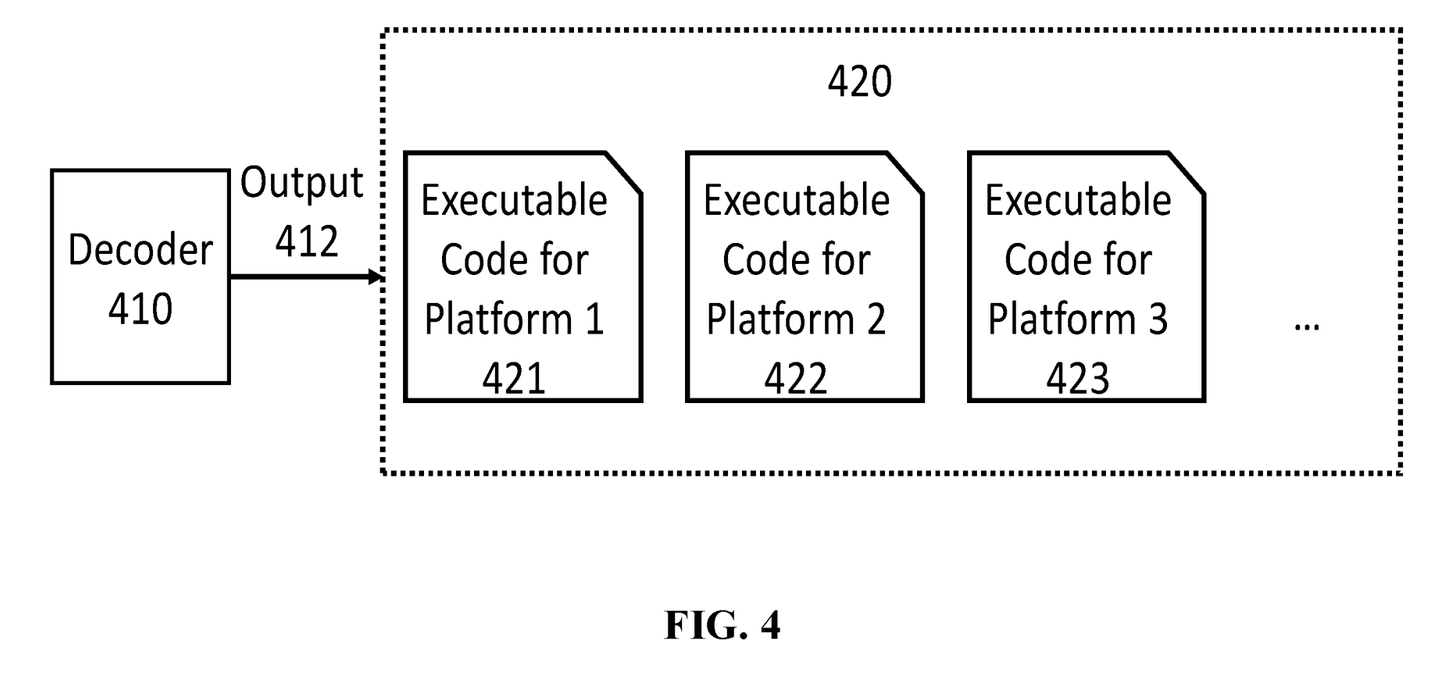
FIG. 4 is a block diagram of the encoder, according to an example of the present disclosure.

FIG. 4 shows an example decoder. Specifically, FIG. 4 shows a Decoder 410 and Heterogenous Platforms 420. Heterogenous Platforms 420 includes Executable Code for Platform 1 421, Executable Code for Platform 2 422, and Executable Code for Platform 3 423. Heterogenous Platforms 420 can include more executable code for numerous platforms. The Decoder 410 outputs Heterogenous Platforms 420. The decoder can generate executable code for various platforms.

Figure 5:
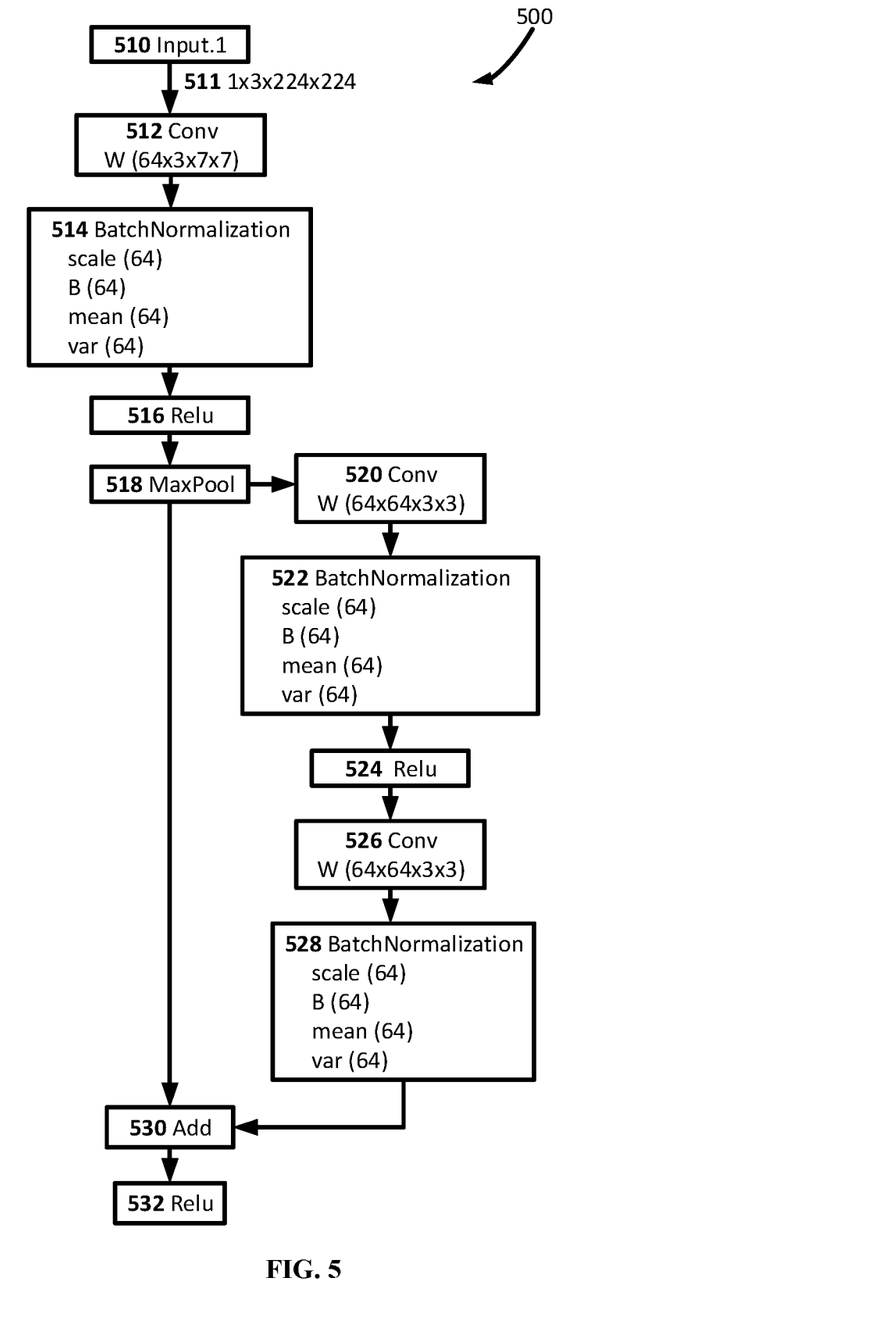
FIG. 5 is a diagram illustrating an example of an input for an encoder, according to an example of the present disclosure.

FIG. 5 shows a machine learning model with a predefined model structure as an input of an encoder. Specifically, FIG. 5 shows a model 500 with 510 Input.1, 511 1×3×224×224 input, 512 Conv, 514 BatchNormalization, 516 Relu, 518 MaxPool, 520 Conv, 522 BatchNormalization, 524 Relu, 526 Conv, 528 BatchNormalization, 530 Add, and 532 Relu. Model 500 has an 510 input.1 that provides 511 input to 512 Conv. The 512 Conv output is the input to 514 BatchNormalization. The output of 513 BatchNormalization is input to 516 Relu. The output of 516 Relu is the input to 518 MaxPool. The output of 518 MaxPool is the input to 520 Conv and 530 Add. The output of 520 Conv is the input to 522 BatchNormalization. The output of 522 BatchNormalization is the input to 524 Relu. The output to 524 Relu is output to 526 Conv. The output of 526 Conv is the input to 528 BatchNormalization. The output of 528 BatchNormalization and 518 MaxPool is input to 530 Add. The output of 530 Add is input to 532 Relu. For example, the machine learning model may be a ResNet 18. The model, for example, may represent the computing graph of a machine learning model. The model may further include ops in each layer (name, implementation methods, parameters), model structure (connection information between layers) and specific weights for each layer.

The encoder can take advantage of existing deep learning compiler, such as an Apache TVM, to generate IR code.

Figure 6:
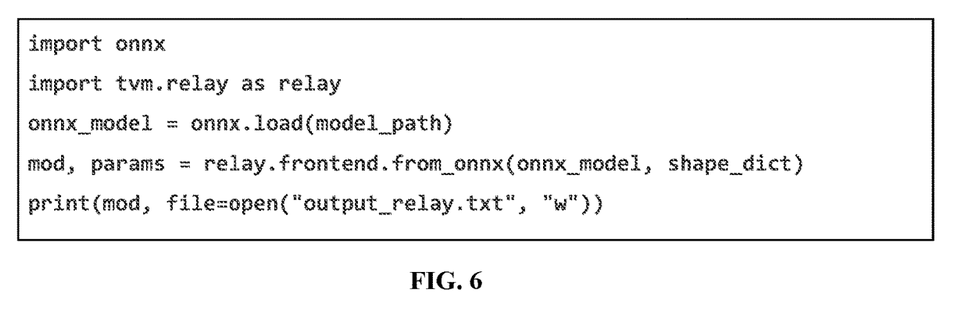
FIG. 6 is an example illustrating of a DL compiler for generating IR code, according to an example of the present disclosure.

FIG. 6 shows an example of using a deep learning compiler such as TVM to generate IR code and save it in the file output_relay.txt.

The new feature of the Encoder is that it can add decoration to the IR code according to the target. The decoration can be Compute Unified Device Architecture (CUDA) graphics processing unit (GPU), central processing unit (CPU), field-programmable gate array (FPGA), etc. It tells the following Decoder to do corresponding process for the given target hardware.

Figure 7:
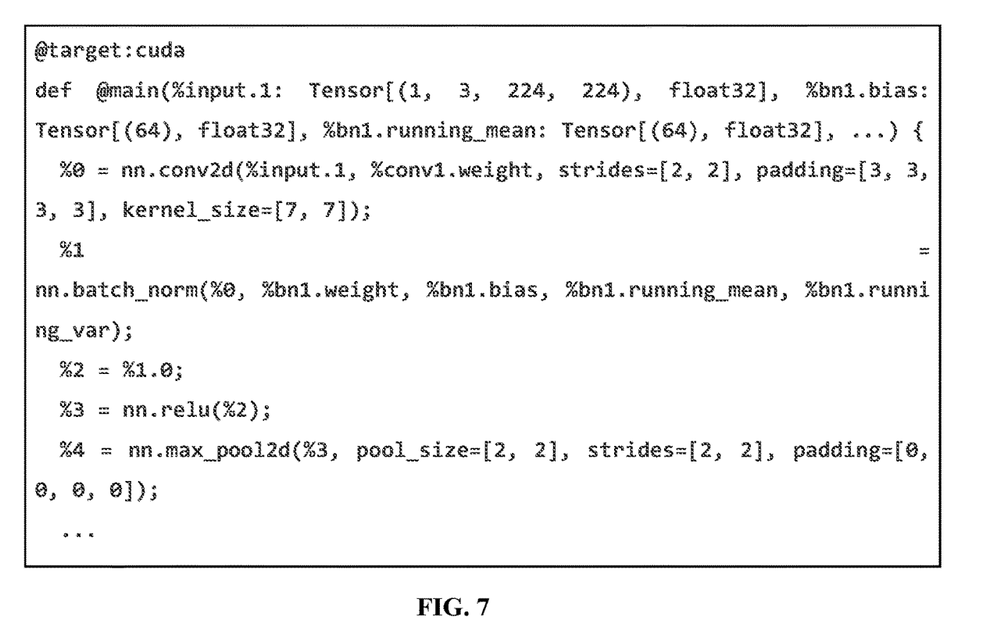
FIG. 7 is an example illustrating IR code as Encoder output, according to an example of the present disclosure.

FIG. 7 shows some IR code with the decoration of CUDA GPU target. The IR code in FIG. 7 may be an example of IR code as an output from an Encoder.

Decoder

Specifically, FIG. 3 shows how the Decoder transfers IR code to target code. First, the Decoder scan the IR code to generate a graph object. The vertices in the graph represent layers or operators in the IR code which is also a representation of the original neural network. And the edges in the graph represent the sequential relations between any two connected layers in the network.

Second, the Decoder traverse the graph object to get layer information from every vertex. The traverse order depends on the dependency between layers. A vertex would be traversed only if its parent vertices had already been traversed.

During the traverse, every vertex generates corresponding executable code according to the layer's information stored in itself. The output executable code could be used on the target platform.

The IR code is the first level intermediate representation. The Decoder takes the IR code as its input. The Decoder then generates a general graph object.

Figure 8:
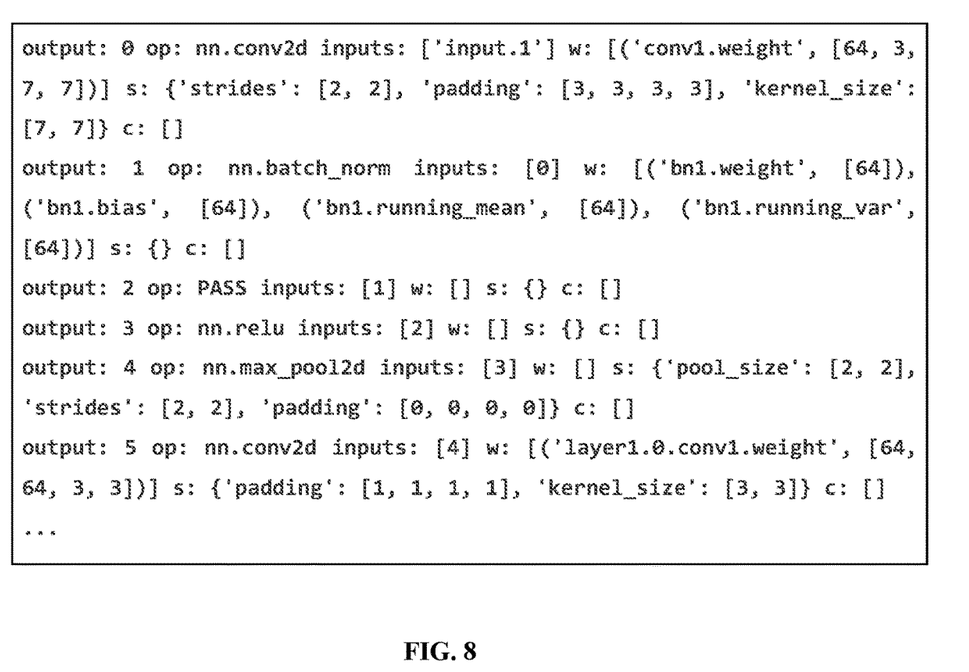
FIG. 8 is an example illustrating a general graph generated by a Decoder, according to an example of the present disclosure.

FIG. 8 shows a general graph generated by the Decoder. Specifically, FIG. 8 shows the text representation of the graph object. Every operation (op) represents a vertex, and the vertex contains the operation's information such as weights (w), strides (s), and settings (s). The input and output of an op construct the edges between different ops.

Figure 9:
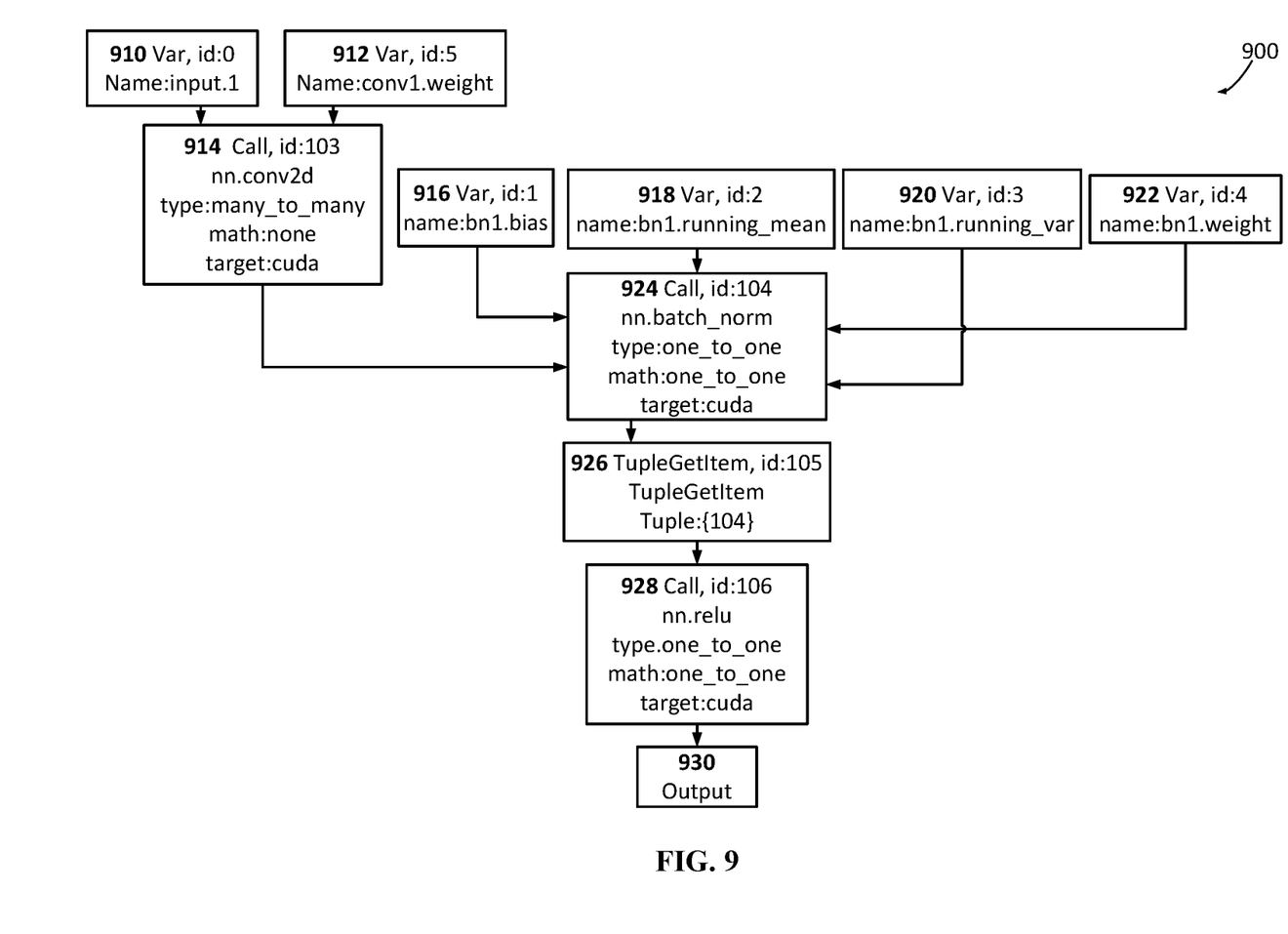
FIG. 9 is a diagram illustrating a CUDA GPU target, according to an example of the present disclosure.

The Decoder then generates specific graph objects for different hardware in order to conduct corresponding optimization. FIG. 9 shows an example graph for CUDA GPU. For different hardware, the generated graph might be different in terms of the graph layout with different types of vertices (i.e., operations). For example, for CUDA GPU, some vertices in the graph can be fused into one single vertex combining operations together; but for FPGA, such fusion is not beneficial.

FIG. 9 shows a graph for CUDA GPU target. Specifically, FIG. 9 shows graph 900 and includes 910 variable 0, 912 variable 5, 916 variable 1, 918 variable 2, 920 variable 3, 922 variable 4, 914 function 103, 924 function 104, 926 function 105, 928 function 106, and 930 output. 910 variable 0 and 912 variable 5 are inputs to 914 function 103. 916 variable 1, 918 variable 2, 920 variable 3, and 922 variable 4 are inputs to 924 function 104. The output of 924 function 104 is the input to 926 function 105. The output of 926 function 105 is the input to 928 function 106. The output of 928 function 106 is the 930 output. For example, the graph defines the computing structure that may include input or internal variable, CUDA functions to be called and computing sequence.

The Decoder traverse the graph object according to its topology. It starts the traverse from the input vertex indicated by the graph object. It visits the input vertex by processing the vertex and generating executable code for its corresponding operation. Then it reads this vertex's neighbor list which contains the next traversing target. Here this vertex is called a parent, and its neighbors are called children. The relation between a parent to one of its children is called an edge. After visiting the parent, the Decoder starts visiting its children following the edges, and continues the traverse procedure until all vertices have been visited.

Figure 10:
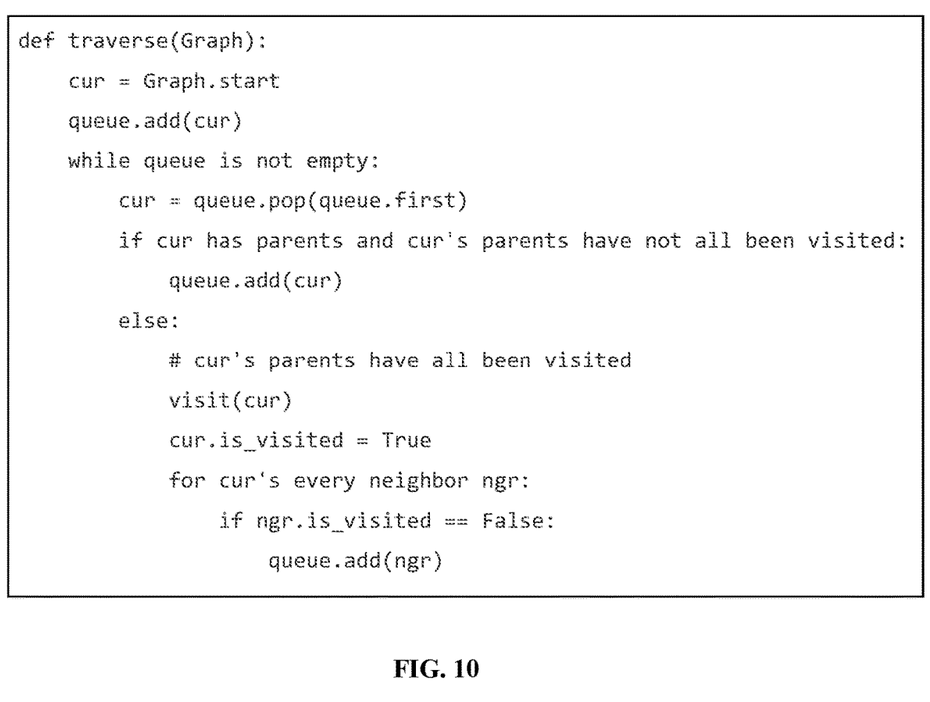
FIG. 10 is an example illustrating a traversing process, according to an example of the present disclosure.

During the traversing, the Decoder needs to consider the dependence between vertices. A vertex can be visited only if all its parents have already been visited. Otherwise, the vertex cannot get complete inputs for its own operation. The following list is the pseudo-code for the traverse process.

FIG. 10. shows a pseudo-code for the traversing process. Specifically, FIG. 10 shows a traverse function of a graph. The traverse function takes a graph and reads through every element in the graph and traverses the graph.

Code Generation

FIG. 4 illustrates that the Decoder is able to generate executable code for various target platforms.

During the traversing, the Decoder generate the executable code of every visited vertex according to the target hardware. It maps the operation of a vertex to the implementation of the operation on the target hardware. One operation on different targets can have different implementation. In that case, the Decoder will map the operation to different executable code according to the target hardware.

Figure 11:
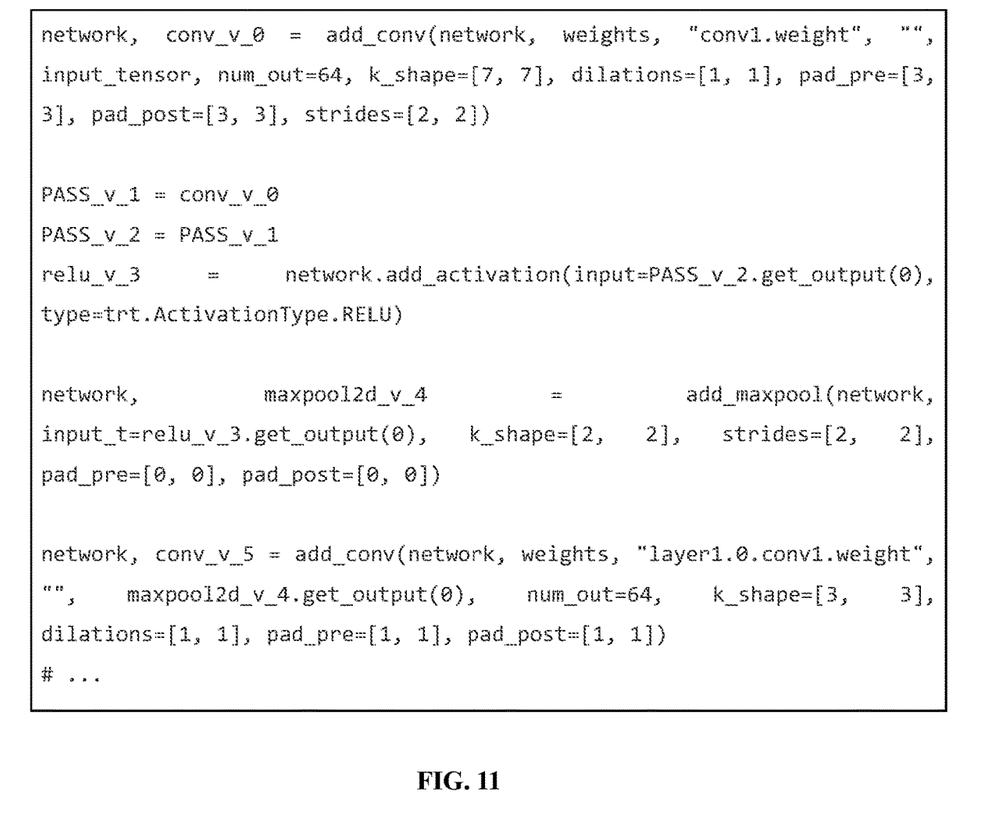
FIG. 11 is an example illustrating executable code generated by a Decoder for CUDA GPU, according to an example of the present disclosure.

FIG. 11 shows an example of implementation for the CUDA GPU target. Specifically, FIG. 11. shows an example executable code generated by Decoder for CUDA GPU. The executable code includes setting parameters for optimizing the execution of the code to run on CUDA hardware. The code converts code parameters and uses rectified linear activation function (ReLU) to optimize the executable code to run on CUDA hardware.

Improvements Proposed

It has several advantages to help DL researchers and developers. First, it taps into the versatility and usability of compiler IR and supports different types of neural networks. Second, it can generate target code for various platforms and software libraries. Third, it is highly customizable for researchers and developers to implement arbitrary optimizations on demand. Overall, the proposed decoder is a useful tool to improve the usability of neural networks on heterogeneous platforms with higher flexibility and better customizability than normal deployment methods.

As mentioned above, the Encoder will add new decoration for the IR code. This is the first level intermediate representation.

Figure 12:
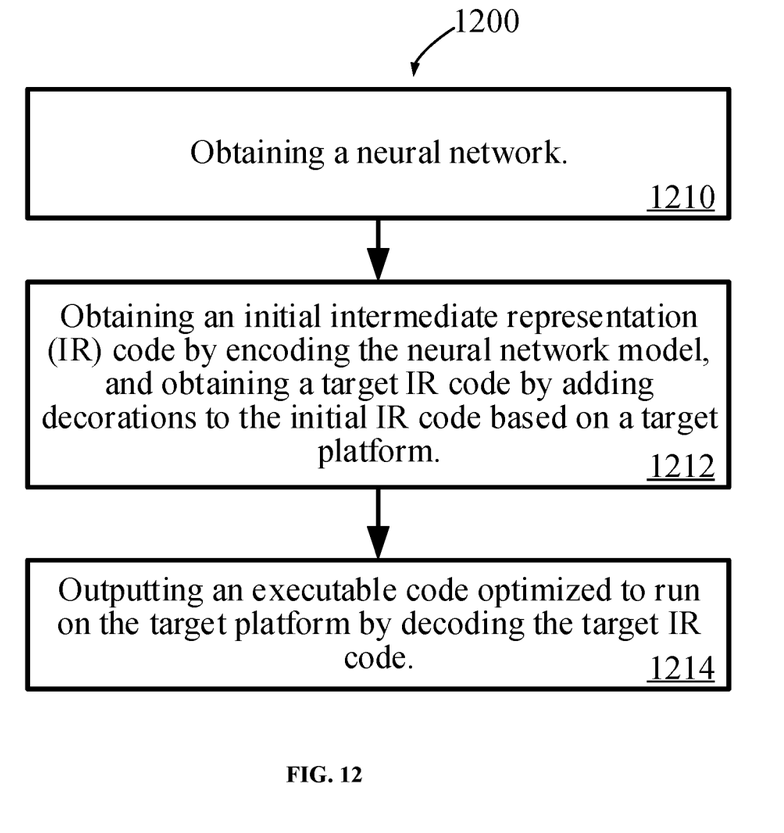
FIG. 12 is a method for generating heterogenous platform code, according to an example of the present disclosure.

FIG. 12 shows a method for decoding a video signal in accordance with the present disclosure.

In step 1210, a neural network model is obtained. The neural network model may be programed to run on at least one platform.

In step 1212, an initial intermediate representation (IR) code is obtained by encoding the neural network model, and a target IR code is obtained by adding decorations to the initial IR code based on a target platform.

In step 1214, an executable code optimized to run on the target platform by decoding the target IR code is outputted.

The Decoder will generate the general graph object and specific graph objects as the second and third level intermediate representation.

The Decoder uses the new traverse method to do traverse the graph.

Figure 13:
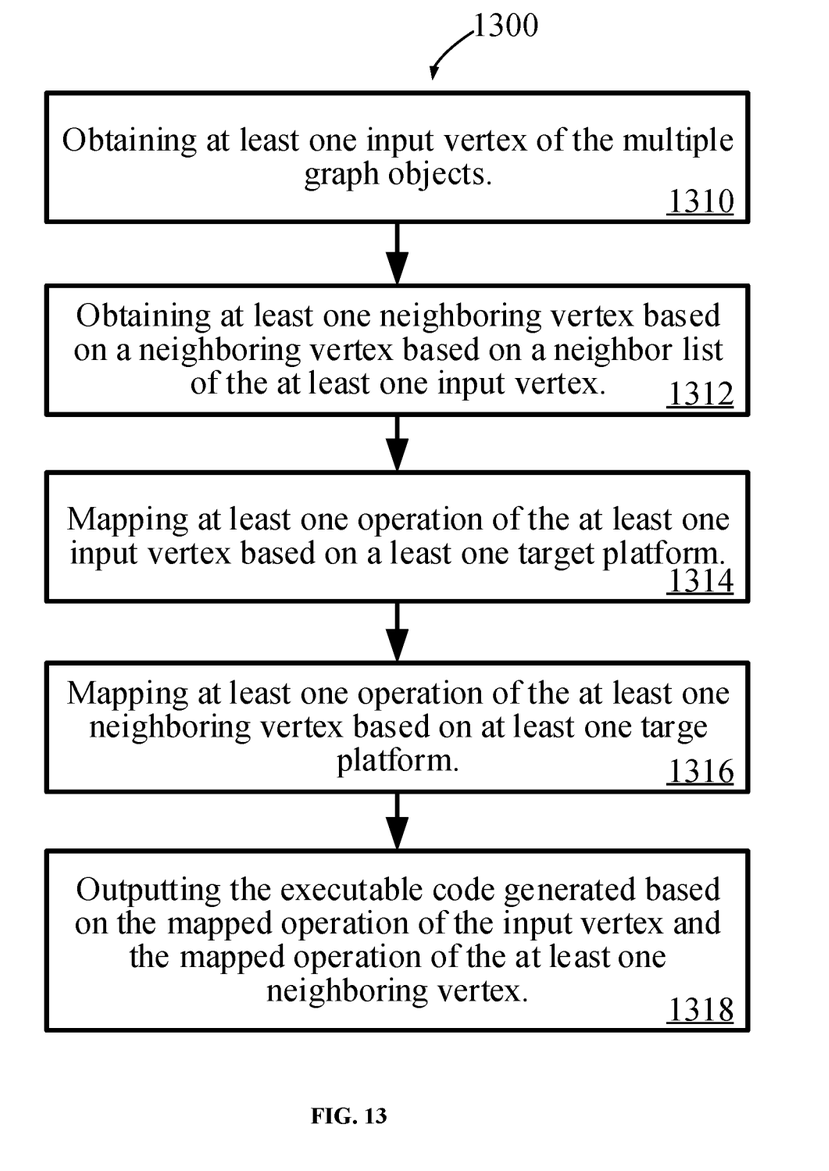
FIG. 13 is a method for generating heterogenous platform code, according to an example of the present disclosure.

FIG. 13 shows a method for decoding a video signal in accordance with the present disclosure.

In step 1310, at least one input vertex of the multiple graph objects is obtained.

In step 1312, at least one neighboring vertex based on a neighbor list of the at least one input vertex is obtained.

In step 1314, at least one operation of the at least one input vertex based on at least one target platform is mapped.

In step 1316, at least one operation of the at least one neighboring vertex based on at least one target platform is mapped.

In step 1318, the executable code generated based on the mapped operation of the input vertex and the mapped operation of the at least one neighboring vertex is outputted.

Figure 14:
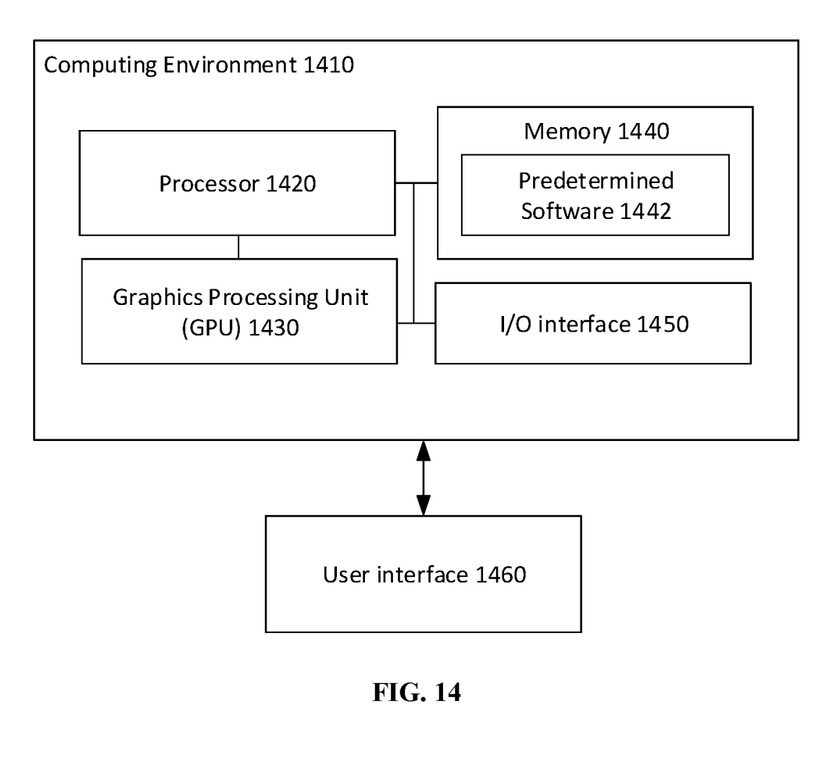
FIG. 14 is a diagram illustrating a computing environment coupled with a user interface, according to an example of the present disclosure.

FIG. 14 shows a computing environment 1410 coupled with user interface 1460. Computing environment 1410 includes processor 1420, graphics processing unit (GPU) 1430, memory 1440, and I/O interface 1450.

The processing component 1420 typically controls overall operations of the computing environment 1410, such as the operations associated with display, data acquisition, data communications, and image processing. The processor 1420 may include one or more processors to execute instructions to perform all or some of the steps in the above described methods. Moreover, the processor 1420 may include one or more modules which facilitate the interaction between the processor 1420 and other components. The processor may be a Central Processing Unit (CPU), a microprocessor, a single chip machine, a GPU, or the like. GPU 1430 can include one or more GPUs interconnected to execute one or more GPU executable programs.

The memory 1440 is configured to store various types of data to support the operation of the computing environment 1410. Examples of such data comprise instructions for any applications or methods operated on the computing environment 1410, MRI datasets, image data, etc. The memory 1440 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 1450 provides an interface between the processor 1420 and peripheral interface modules, such as a keyboard, a click wheel, buttons, and the like. The buttons may include, but are not limited to, a home button, a start scan button, and a stop scan button.

In an embodiment, the computing environment 1410 may be implemented with one or more application specific integrated circuits (ASICs), digital signal processors (DSPs), digital signal processing devices (DSPDs), programmable logic devices (PLDs), field programmable gate arrays (FPGAs), graphical processing units (GPUs), controllers, micro-controllers, microprocessors, or other electronic components, for performing the above methods.

In an embodiment, there is also provided a non-transitory computer-readable storage medium comprising instructions, such as comprised in the memory 1440, executable by the processor 1420 in the computing environment 1410, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 1410 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for generating heterogenous platform code comprising:
    obtaining a neural network model, wherein the neural network model is programed to run on at least one platform;
    obtaining an initial intermediate representation (IR) code by encoding the neural network model, and obtaining a target IR code by adding decorations to the initial IR code based on a target platform; and
    outputting an executable code optimized to run on the target platform by decoding the target IR code, wherein outputting the executable code optimized to run on the target platform by decoding the target IR code comprises:
        obtaining multiple graph objects based on a scan of the target IR code, and
        outputting the executable code based on a traverse of the multiple graph objects.

2. The method of claim 1, wherein the decorations are associated with target platforms that comprise graphics processing unit (GPU), central processing unit (CPU), and field-programmable gate array (FPGA) hardware.

3. The method of claim 2, wherein obtaining the multiple graph objects based on the scan of the target IR code comprises:
    obtaining a general graph object based on the scan of the target IR code; and obtaining the multiple graph objects based on the general graph object, wherein the multiple graph objects are optimized to run on different target platforms.

4. The method of claim 3, wherein obtaining the multiple graph objects based on the general graph object comprises:
    obtaining the multiple graph objects based on the general graph object; and
    optimizing the multiple graph objects to run on the different target platforms based on vertices in the at least one graph object being fused into a vertex that combines operations together.

5. The method of claim 2, wherein outputting the executable code based on the traverse of the multiple graph objects comprise:
    obtaining at least one input vertex of the multiple graph objects;
    obtaining at least one neighboring vertex based on a neighbor list of the at least one input vertex; and
    outputting the executable code generated based on the at least one input vertex and the at least one neighboring vertex.

6. The method of claim 2, wherein outputting the executable code based on the traverse of the multiple graph objects comprise:
    obtaining at least one input vertex of the multiple graph objects;
    obtaining at least one neighboring vertex based on a neighbor list of the at least one input vertex;
    mapping at least one operation of the at least one input vertex based on at least one target platform;

mapping at least one operation of the at least one neighboring vertex based on at least one target platform; and
outputting the executable code generated based on the mapped operation of the input vertex and the mapped operation of the at least one neighboring vertex.

7. A computing device comprising:
one or more processors; and
a non-transitory computer-readable memory storing instructions executable by the one or more processors, wherein the one or more processors are configured to:
obtain a neural network model, wherein the neural network model is programed to run on at least one platform;
obtain an initial intermediate representation (IR) code by encoding the neural network model, and obtaining a target IR code by adding decorations to the initial IR code based on a target platform; and
output an executable code optimized to run on the target platform by decoding the target IR code, wherein the one or more processors configured to output the executable code optimized to run on the target platform by decoding the target IR code are further configured to:
obtain multiple graph objects based on a scan of the target IR code; and
output the executable code based on a traverse of the multiple graph objects.

8. The computing device of claim 7, wherein the decorations are associated with target platforms that comprise graphics processing unit (GPU), central processing unit (CPU), and field-programmable gate array (FPGA) hardware.

9. The computing device of claim 7, wherein the one or more processors configured to obtain the multiple graph objects based on the scan of the target IR code are further configured to:
obtain a general graph object based on the scan of the target IR code; and
obtain the multiple graph objects based on the general graph object, wherein the multiple graph objects are optimized to run on different target platforms.

10. The computing device of claim 9, the one or more processors configured to obtain the multiple graph objects based on the general graph object are further configured to:
obtain the multiple graph objects based on the general graph object; and
optimize the multiple graph objects to run on the different target platforms based on vertices in the at least one graph object being fused into a vertex that combines operations together.

11. The computing device of claim 7, wherein the one or more processors configured to output the executable code based on the traverse of the multiple graph objects are further configured to:
obtain at least one input vertex of the multiple graph objects;
obtain at least one neighboring vertex based on a neighbor list of the at least one input vertex; and
output the executable code generated based on the at least one input vertex and the at least one neighboring vertex.

12. The computing device of claim 7, wherein the one or more processors configured to output the executable code based on the traverse of the multiple graph objects are further configured to:
obtain at least one input vertex of the multiple graph objects;
obtain at least one neighboring vertex based on a neighbor list of the at least one input vertex;
map at least one operation of the at least one input vertex based on at least one target platform;
map at least one operation of the at least one neighboring vertex based on at least one target platform; and
output the executable code generated based on the mapped operation of the input vertex and the mapped operation of the at least one neighboring vertex.

13. A non-transitory computer-readable storage medium storing a plurality of programs for execution by a computing device having one or more processors, wherein the plurality of programs, when executed by the one or more processors, cause the computing device to perform acts comprising:
obtaining a neural network model, wherein the neural network model is programed to run on at least one platform;
obtaining an initial intermediate representation (IR) code by encoding the neural network model, and obtaining a target IR code by adding decorations to the initial IR code based on a target platform; and
outputting an executable code optimized to run on the target platform by decoding the target IR code, wherein the plurality of programs further cause the computing device to perform:
obtaining multiple graph objects based on a scan of the target IR code; and
outputting the executable code based on a traverse of the multiple graph objects.

14. The non-transitory computer-readable storage medium of claim 13, wherein the decorations are associated with target platforms that comprise graphics processing unit (GPU), central processing unit (CPU), and field-programmable gate array (FPGA) hardware.

15. The non-transitory computer-readable storage medium of claim 13, wherein the plurality of programs further cause the computing device to perform:
obtaining a general graph object based on the scan of the target IR code; and
obtaining the multiple graph objects based on the general graph object, wherein the multiple graph objects are optimized to run on different target platforms.

16. The non-transitory computer-readable storage medium of claim 15, wherein the plurality of programs further cause the computing device to perform:
obtaining the multiple graph objects based on the general graph object; and
optimizing the multiple graph objects to run on the different target platforms based on vertices in the at least one graph object being fused into a vertex that combines operations together.

17. The non-transitory computer-readable storage medium of claim 13, wherein the plurality of programs further cause the computing device to perform:
obtaining at least one input vertex of the multiple graph objects;
obtaining at least one neighboring vertex based on a neighbor list of the at least one input vertex; and
outputting the executable code generated based on the at least one input vertex and the at least one neighboring vertex.

18. The non-transitory computer-readable storage medium of claim 13, wherein the plurality of programs further cause the computing device to perform:
obtaining at least one input vertex of the multiple graph objects;

obtaining at least one neighboring vertex based on a neighbor list of the at least one input vertex;

mapping at least one operation of the at least one input vertex based on at least one target platform;

mapping at least one operation of the at least one neighboring vertex based on at least one target platform; and outputting the executable code generated based on the mapped operation of the input vertex and the mapped operation of the at least one neighboring vertex.

* * * * *